(12) United States Patent
Lindoff et al.

(10) Patent No.: US 7,729,315 B2
(45) Date of Patent: Jun. 1, 2010

(54) SYSTEM AND METHOD OF PERFORMING CELL MEASUREMENTS IN A TELECOMMUNICATIONS SYSTEM

(75) Inventors: Bengt Lindoff, Bjarred (SE); Anders Wallén, Eslov (SE); Johan Nilsson, Hollviken (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 338 days.

(21) Appl. No.: 11/764,651

(22) Filed: Jun. 18, 2007

(65) Prior Publication Data

US 2007/0298780 A1 Dec. 27, 2007

Related U.S. Application Data

(60) Provisional application No. 60/805,652, filed on Jun. 23, 2006.

(51) Int. Cl.
*H04W 4/00* (2009.01)
(52) U.S. Cl. .................................. 370/332; 370/503
(58) Field of Classification Search .............. 370/241, 370/241.1, 350, 331, 332, 333, 334
See application file for complete search history.

(56) References Cited

U.S. PATENT DOCUMENTS 6,707,842 B2  3/2004  Rick

| 2003/0117996 | A1  | 6/2003 | Lim |
| 2004/0058650 | A1  | 3/2004 | Palenius |
| 2004/0095953 | A1* | 5/2004 | Bellier et al. ............... 370/442 |
| 2005/0201355 | A1* | 9/2005 | Saito ........................ 370/350 |
| 2006/0072450 | A1* | 4/2006 | Miyoshi et al. ............. 370/205 |
| 2008/0069028 | A1* | 3/2008 | Richardson ................. 370/328 |

* cited by examiner

*Primary Examiner*—Huy D Vu
*Assistant Examiner*—Adnan Baig
(74) *Attorney, Agent, or Firm*—Michael G. Cameron

(57) ABSTRACT

A method of performing cell measurements in a telecommunications system. The method includes the steps of receiving a signal by a user equipment (UE) operating within the telecommunications system and served by a serving cell, storing the received signal in a buffer, and determining a first portion of the signal related to the serving cell and a second portion related to neighbor (NB) cells. The first portion of the signal is decoded by the Fast Fourier Transforms (FFT) and the signal strength is estimated by a measurement unit coupled to the FFT. Next, any approximately synchronized NB cell signals in the second portion of the signal are then decoded and a signal strength is estimated. It is then determined if sufficient time remains to process unsynchronized NB cell signals of the second portion of the signal. If it is determined that sufficient time remains, the second portion of the signal is played back and decoded using the FFT and a signal strength of any unsynchronized NB cell signals of the second portion of the received signal is estimated.

26 Claims, 7 Drawing Sheets

SYSTEM AND METHOD OF PERFORMING CELL MEASUREMENTS IN A TELECOMMUNICATIONS SYSTEM

CROSS-REFERENCE TO RELATED APPLICATIONS

This application claims the benefit of U.S. Provisional Application No. 60/805,652, filed Jun. 23, 2006 and is hereby incorporated by reference.

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

BACKGROUND OF THE INVENTION

This invention relates to communication systems. More particularly, and not by way of limitation, the invention is directed to a system and method of performing cell measurements in a telecommunications system.

In the forthcoming evolution of the mobile cellular standards, such as Global System for Mobile Communications (GSM) and Wideband-Code Division Multiple Access (WCDMA), new modulation techniques such as Orthogonal Frequency Division Multiplexing (OFDM) are likely to occur. Furthermore, in order to have a smooth migration of the old cellular systems to the new high capacity high data rate system in the existing radio spectrum, the new system has to be able to operate on a flexible bandwidth (BW). A proposal for such a new flexible cellular system is 3G Long Term Evolution (3G LTE), which is an evolution from the 3G WCDMA standard. This system utilizes OFDM as a multiple access technique (called OFDMA) in the downlink and is able to operate on a bandwidth spanning from 1.25 MHz to 20 MHz. Furthermore, data rates up to 100 Mb/s will be possible in this high bandwidth system.

The 3G LTE system allows for use in a "Reuse One" fashion (i.e., all cells share the same carrier frequency). Therefore, neighbor cell measurements needed for mobility (handover) purposes can be made in similar fashion as in WCDMA. Furthermore, the different BW possibilities in LTE introduces additional neighbor (NB) cell measurements that need to be considered. For example, in some scenarios there may be a "hot spot" cell with a specific bandwidth (e.g., 20 MHz), while neighboring cells may be using another bandwidth (e.g., 5 or 10 MHz). Similar scenarios may occur in the border between countries or other geographical or political boundaries.

There are several scenarios where different NB cell configurations need to be handled in LTE. Intra-frequency neighbor cell measurements are performed by a user equipment (UE) when the current and target cell operates on the same carrier frequency. In this case, the UE is able to carry out such measurements without measurement gaps. Neighbor cell measurements performed by the UE are considered as inter-frequency measurements when the neighbor cell operates on a different carrier frequency in comparison to the current cell. In this situation, the UE is unable to carry out such measurements without measurement gaps.

Depending on whether the UE needs transmission/reception gaps to perform the relevant measurements, measurements are classified as gap assisted or non-gap assisted. A non-gap assisted measurement is a measurement on a cell that does not require transmission/reception gaps to allow the measurement to be performed. A gap assisted measurement is a measurement on a cell that requires transmission/reception gaps to allow the measurement to be performed. Whether a measurement is non-gap assisted or gap assisted depends on the current operating frequency. The UE determines whether a particular cell measurement needs to be performed in a transmission/reception gap.

In the situation where cells operate on the same carrier frequency, gaps are not needed to perform the measurements. If the cells' carrier frequencies differ, gap assisted measurements are needed which are independent of the UE/cell bandwidth. These measurement gaps are provided and controlled by the network.

FIG. 1A is a simplified block diagram illustrating an intra-frequency measurement scenario in LTE. In FIG. 1, a UE 10 communicates with a current cell 12. The current cell 12 and a target cell 14 have the same carrier frequency and bandwidth. This is the most common measurement scenario. In this scenario, measurement gaps are not required.

FIG. 1B is a simplified block diagram illustrating a second intra-frequency measurement scenario in LTE. The current cell 12 and the target cell 14 have the same carrier frequency. However, the bandwidth of the target cell is less than the bandwidth of the current cell.

FIG. 1C is a simplified block diagram illustrating a third intra-frequency measurement scenario in LTE. In this scenario, the current cell 12 and the target cell 14 have the same carrier frequency. However, the bandwidth of the target cell is greater than the bandwidth of the current cell.

FIG. 2A is a simplified block diagram illustrating a first inter-frequency measurement scenario in LTE. The current cell and the target cell have different carrier frequencies. In addition, the bandwidth of the target cell is less than the bandwidth of the current cell and the center part of the bandwidth of the target cell is within the bandwidth of the current cell. In this scenario, since it is an inter-frequency scenario, measurement gaps are utilized.

FIG. 2B is a simplified block diagram illustrating a second inter-frequency measurement scenario in LTE. The current cell and the target cell have different carrier frequencies. In addition, the bandwidth of the target cell is greater than the bandwidth of the current cell and the center part of the bandwidth of the target cell is within the bandwidth of the current cell.

FIG. 2C is a simplified block diagram illustrating a third inter-frequency measurement scenario in LTE. The center part of the bandwidth of the target cell is outside the bandwidth of the current cell. In this scenario, measurement gaps are required.

The above figures show the different NB cell configurations that are encountered and require action in LTE. For handoff measurements, typically only a subfraction of the entire bandwidth is used for cell search (i.e., 1.25 MHz). Cell measurements are denoted in FIGS. 1 and 2 as measurement bandwidth (Meas BW). In FIG. 1A, this is the most common scenario corresponding to legacy intra-frequency measurements. In LTE, the scenarios of FIGS. 1B and 1C are also defined as intra-frequency measurements. Since the carrier frequency for the NB cells in FIGS. 1B and 1C is the same as the serving cell, the UE typically performs the measurements on these NB cells without interruption (i.e., no measurement gap) in the data reception. In FIG. 2C, a pure (legacy) inter-frequency measurement scenario is shown (i.e., similar to the WCDMA case). For this scenario, a gap in the reception from the serving cell is needed to conduct the measurements, such that the radio can be retuned to the NB cell carrier frequency. For LTE, in FIGS. 2A and 2B, the scenarios also are inter-frequency measurements and reception gaps are required. In these scenarios, the carrier frequency for the NB cells is not aligned with the carrier frequency for the serving cell. However, the reception bandwidth for the UE still covers the measurements portions in FIGS. 2A and 2B, without changing the local oscillator frequency.

A system and method of performing cell measurements for all the scenarios discussed above is needed. Currently, there are three different existing solutions for performing the measurements on all the scenarios. First, gaps may be created in the intra-frequency measurement scenarios. When the UE is close to the cell border, the UE requests an interruption in the reception in order to allocate the Fast Fourier Transforms (FFT) to the neighbor cell. Thus, a similar way is needed for inter-frequency handoff. The disadvantage with this solution is that a lower throughput is achieved due to the need for interrupting the data reception.

In the second existing solution, synchronized base stations are utilized. To accomplish this solution, all cells have the same timing when using the FFT. All cells' (both serving and neighbor) pilot signals are detected and the signal strength is estimated. The disadvantage of this solution is that the cells must be synchronized.

In the third existing solution, two FFTs are utilized. One of the FFTs is used for serving cell detection and one of the FFT is used for neighbor cell measurements. Since two FFTs are used, an increased chip area cost in the UE is necessary.

Therefore, a system and method for performing the cell measurements utilizing a single FFT in both the inter-frequency and intra-frequency scenarios is needed. The present invention provides such a system and method.

BRIEF SUMMARY OF THE INVENTION

In one aspect, the present invention is directed to a method of performing cell measurements in a telecommunications system. The method includes the steps of receiving a signal by a user equipment (UE) operating within the telecommunications system and served by a serving cell, storing the received signal in a buffer, and determining a first portion of the signal related to the serving cell and a second portion related to neighbor (NB) cells. The first portion of the signal is decoded and the signal strength is estimated by a measurement unit coupled with a Fast Fourier Transforms (FFT). Next, any approximately synchronized NB cell signals in the second portion of the signal are then decoded and a signal strength is estimated. It is then determined if sufficient time remains to process unsynchronized NB cell signals of the second portion of the signal. If it is determined that sufficient time remains, the second portion of the signal is played back and decoded using the FFT and a signal strength of any unsynchronized NB cell signals of the second portion of the received signal is estimated.

In another aspect, the present invention is a system for performing cell measurements in a telecommunications system. The system includes a receiver for receiving a signal by a UE operating within the telecommunications system and served by a serving cell, a buffer for storing the received signal, a FFT for processing a signal, and a measurement unit for decoding and estimating a signal strength. The signal includes a first portion relating to the serving cell and a second portion related to neighbor (NB) cells. The first portion is processed first by the FFT. Within the second portion of the received signal, it is determined if any NB cell signal is approximately synchronized with the serving cell. The measurement unit then estimates a signal strength of any synchronized NB cell signal of the second portion of the received signal. If sufficient time remains to process unsynchronized NB cell signals of the second portion, the second portion of the signal is played back and decoded using the FFT and a signal strength of any unsynchronized NB cell signals of the second portion of the received signal is estimated.

BRIEF DESCRIPTION OF THE SEVERAL VIEWS OF THE DRAWING

In the following, the features of the invention will be described in detail by showing preferred embodiments, with reference to the attached figures in which.

DETAILED DESCRIPTION OF THE INVENTION

Figure 3:
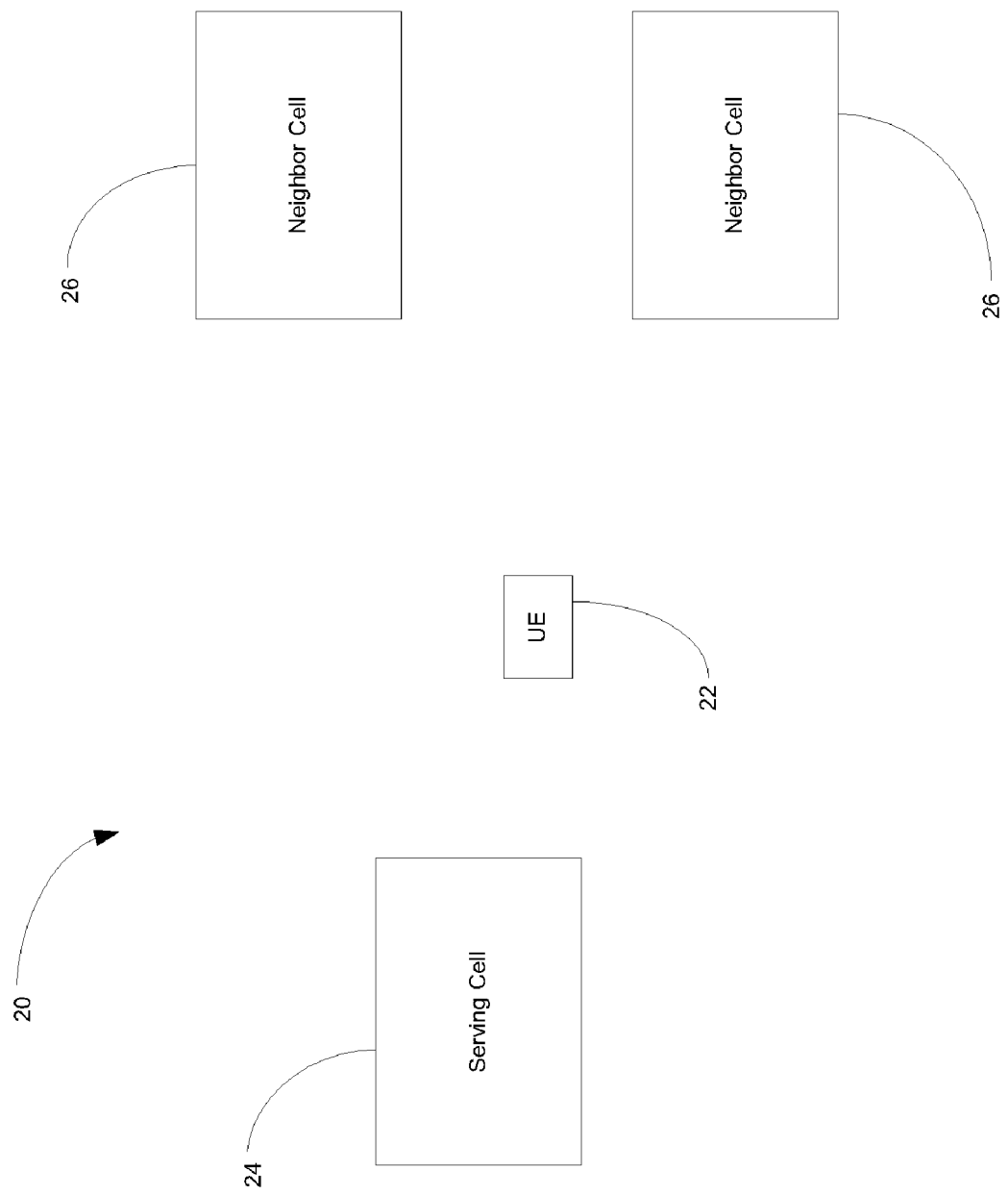
FIG. 3 is a simplified block diagram of a telecommunications system in the preferred embodiment of the present invention.

The present invention is a system and method of performing cell measurements in a telecommunications system. FIG. 3 is a simplified block diagram of a telecommunications system 20 in the preferred embodiment of the present invention. The telecommunications system may be any type of system, however, in the preferred embodiment of the present invention, the telecommunications system is an 3G LTE system or an Worldwide Interoperability for Microwave Access (WiMax) system.

Figure 1A:
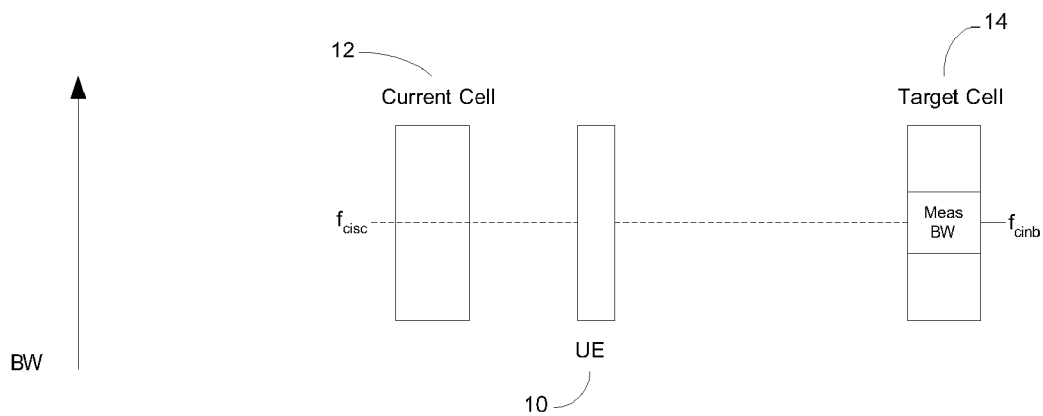
FIGS. 1A-1C illustrates intra-frequency measurement scenarios in LTE.
Figure 1B:
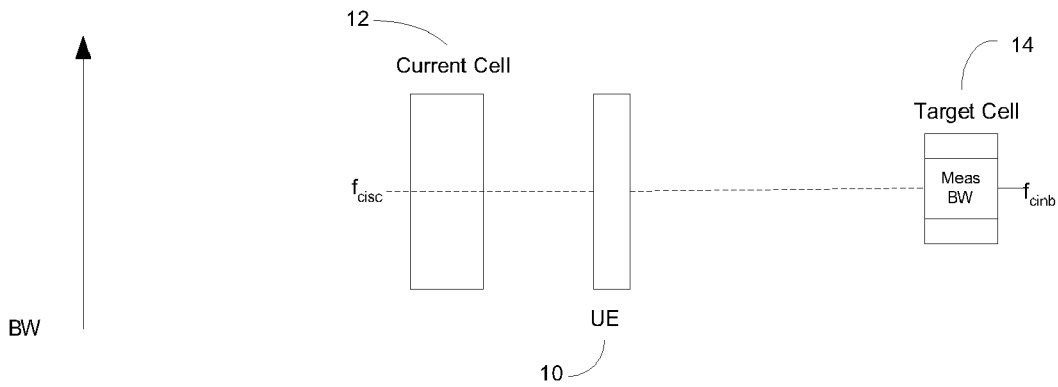
Figure 1C:
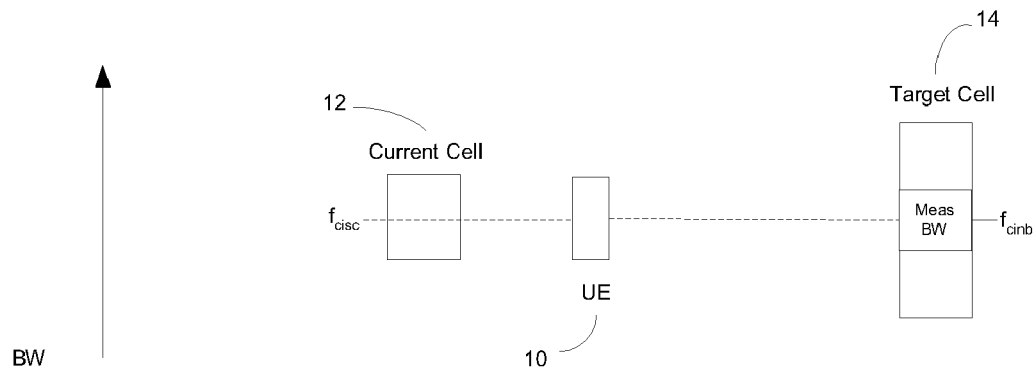

A UE 22 is located within the telecommunications system 20 and is serviced by a serving cell (SC) 24. The UE receives signals from one or more NB cells 26. The present invention provides a method and system for NB cell measurements and cell searching for all the scenarios discussed in FIGS. 1A, 1B, 1C, 2A, 2B. Inter-frequency measurements shown in FIGS. 2A and 2B can be treated in a similar way as intra-frequency measurements shown in FIGS. 1A, 1B and 1C. Either based on a neighbor cell list or on detected cells, a receiver within the UE 22 measures NB cells 26. The FFT (see FIG. 4), through a measurement unit (Meas unit), conducts measurements (Meas BW) on the measurement portion of the signal corresponding to the respective NB cell 26 at time instances when the FFT is idle (i.e., when the FFT is not conducting processing of the serving cell). The present invention accomplishes this process by storing the received signal in a buffer within the UE and playing back the received signal to the FFT. If the NB cell carrier frequency is not the same as the SC 24 (e.g., due to some offset commanded by the network or due to Doppler), a frequency adjustment unit adjusts the frequency to match the FFT frequency bins prior to the FFT processing. Furthermore, in the preferred embodiment of the present invention, when measurements are conducted on the NB cells using gaps in the serving cell reception as ordered by the network (i.e., the scenarios of FIGS. 2A and 2B), the radio front end receiver of the UE is turned off, the data from the buffer is played back, optionally frequency adjusted and processed by the FFT. It should be understood that for "almost synced" cells, additional FFT processing is not required. For an "unsynced" NB cell, the playback is conducted corresponding to the NB cell, prior to FFT processing.

Figure 4:
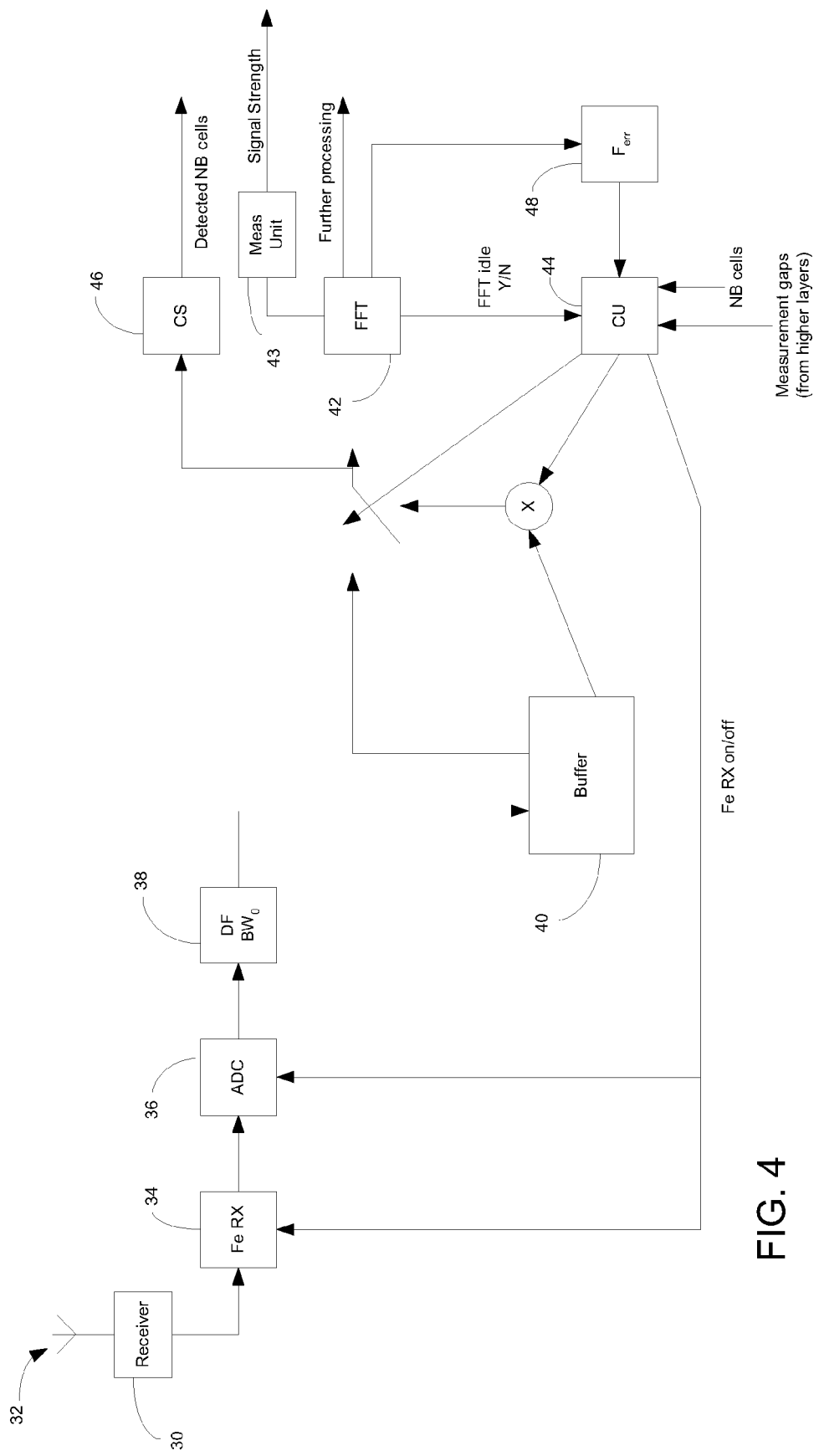
FIG. 4 is a block diagram of the components within the UE for conducting cell measurements in the preferred embodiment of the present invention.

FIG. 4 is a block diagram of the components within the UE 22 for conducting cell measurements in the preferred embodiment of the present invention. A receiver 30 receives a signal through an antenna 32. The signal is down-converted and processed through a low-pass filter to an analog base band signal Fe Rx 34, AD converted at an Analog-to-Digital Converter (ADC) 36, and digitally filtered through a filter with bandwidth $BW_0$ at digital filter (DF) $BW_0$ 38. The $BW_0$ filtered signal includes the signal from the SC 24, as well as signals from NB cells 26 having measurement information (meas BW) within the $BW_0$. The signal is then fed to a buffer 40 and simultaneously fed to an FFT 42. The FFT 42 generates f-domain samples that are then further processed. At a specified time instance, when the FFT is idle, a control unit (CU) 44 instructs the playback of the stored signal from the buffer to the FFT. The NB cell measurements are then made upon the signal by a measurement unit (meas unit) 43. By letting the FFT processing time of one symbol be smaller than the OFDM symbol length, sufficient time is allotted for the meas unit to conduct measurements on neighboring cell signals. Typically different cells have different scrambling codes, hence the signal needs to be de-scrambled with the respective NB cell scrambling code before measurements are taken. The necessary information for NB cells 26 are either detected in the cell search unit (CS) 46 and/or received from the network (e.g., neighbor list, higher layer information). In the case where there is a frequency offset between the SC cell and the NB cell, either due to the NB cell having another carrier frequency or due to Doppler spread (estimated in a $F_{err}$ unit 48), the signal is adjusted before the buffered signal is applied for processing by the FFT. The adjustment is done such that the measurement portion (Meas BW) portion of the FFT processed signal of the NB cells is on the same frequency grid as the SC 24 (see FIG. 5). For "almost synced" cells, a new FFT is not required. For an "unsynced" NB cell, the playback is conducted corresponding to the NB cell, prior to FFT processing.

The present invention utilizes the buffer 40 prior to processing the signal within the FFT 42. The FFT processing of an OFDM symbol is preferably at least twice as fast as the OFDM symbol rate. In addition, the control unit 44 controls the FFT to first decode and estimate the signal strength for the SC 24 OFDM symbol, as well as the possible estimate of the signal strength for NB cells that is in synch with the SC 24. The remaining time (until the next OFDM symbol) is utilized to playback information from the buffer to the FFT. The playback is based on timing on the NB cells 26 not in synch with the SC and intra-frequency measurements on these NB cells are made. Thus, an unsynced NB cell, the playback is conducted corresponding to the NB cell, prior to FFT processing. For an almost synced cell, a new FFT is not required.

Figure 5:
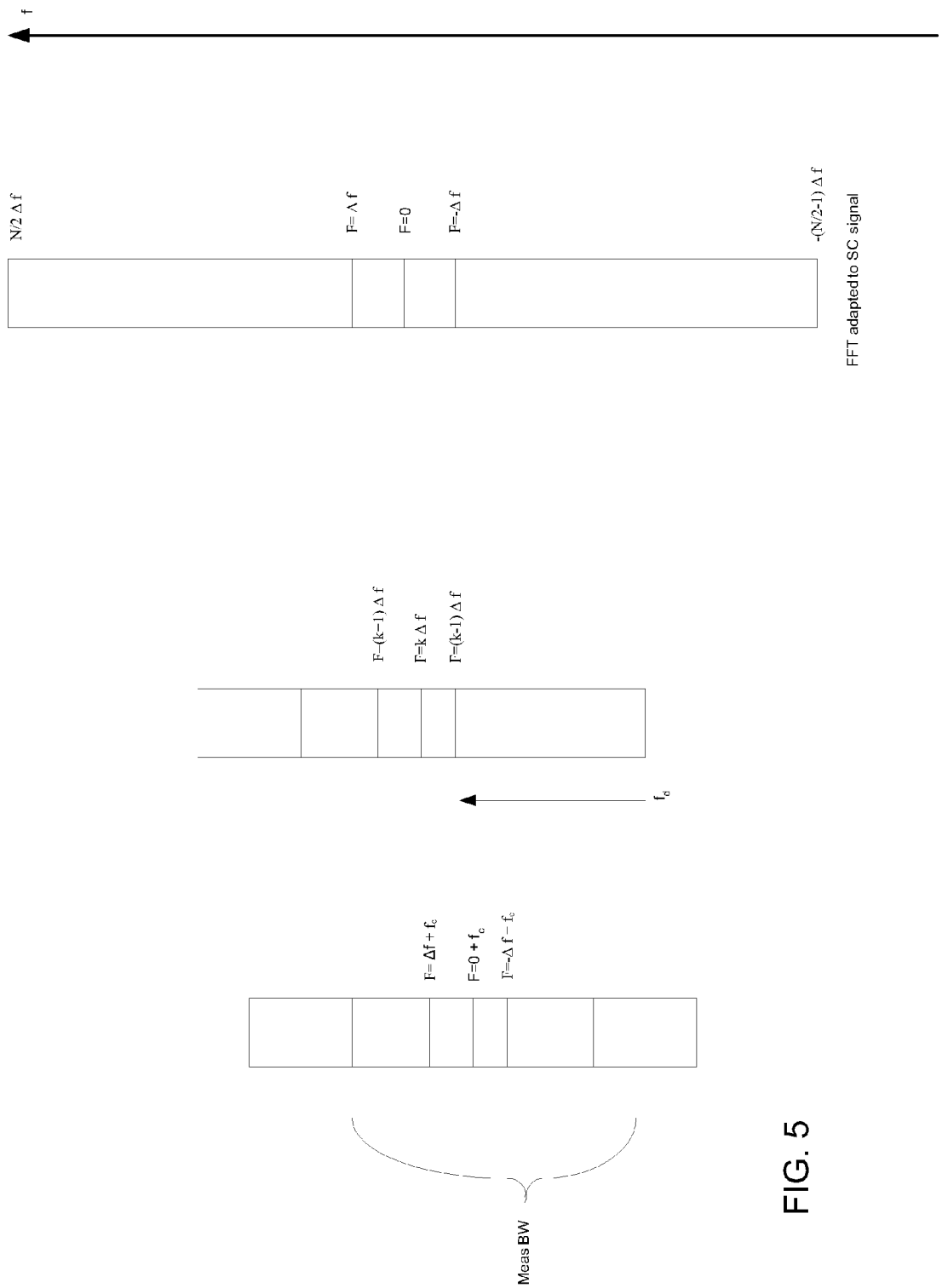
FIG. 5 illustrates a frequency shift on an FFT processed signal in the preferred embodiment of the present invention.

FIG. 5 illustrates a frequency shift on an FFT processed signal in the preferred embodiment of the present invention. The NB cell offset frequency (relative to the SC 24) is $f_c$. The signal is shifted $f_d$, where $f_d$ corresponds to the difference needed for the NB cell frequency grid to become the same as the SC grid. In LTE, $\Delta f$ is 15 kHz (or 7.5 kHz) and therefore, the maximum necessary $f_d$ is 7.5 (3.75) kHz. However, there may be situations where $f_d = f_c$. F represents the frequency for a specified sub-carrier frequency. Thus, a frequency shift is added such that the sub-carrier frequencies for the NB cell are aligned with the SC sub-carrier frequencies.

Figure 2A:
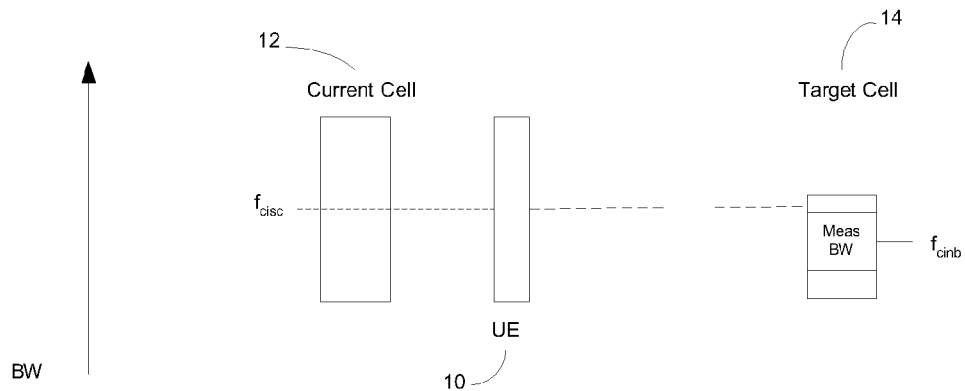
FIGS. 2A-2C illustrates inter-frequency measurement scenarios in LTE.
Figure 2B:
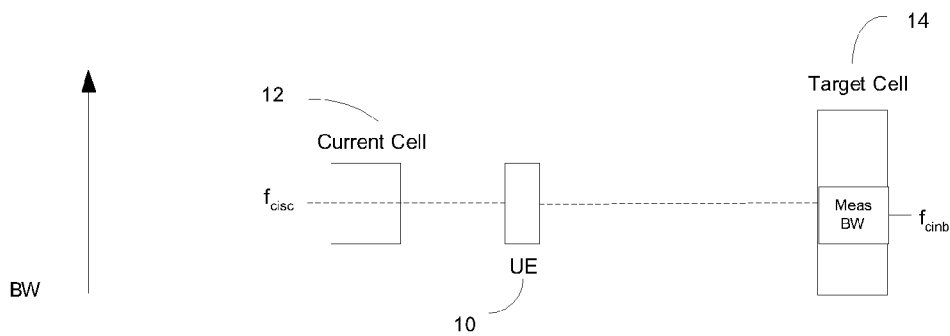
Figure 2C:
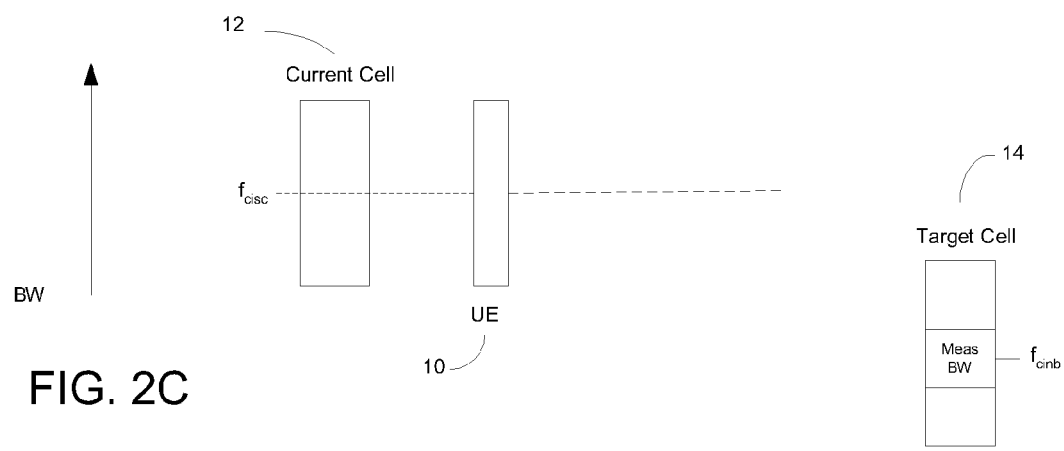

As in the scenarios described in FIGS. 2A and 2B, a higher layer may inform the UE to conduct measurements during reception gaps, i.e., interruption in received data. In this case, the stored signal (prior to the gap) is played back, frequency adjusted and FFT processed. Furthermore, the NB cell measurements are conducted. Simultaneously, the front end RX and ADC are turned off, thereby saving power.

For LTE, currently two different sub-carrier spacings, $\Delta f = 7.5$ and 15 kHz are defined. Therefore, the UE needs to be able to do measurements on NB cells having different carrier spacings. In the 7.5 kHZ case, the symbols are twice as long and hence an FFT 2048 is need for 10 MHz (compared to 20 MHz in the $\Delta f = 15$ kHz case). The present invention also covers this scenario. For example, in the case where the SC has a carrier spacing of 15 kHz and the NB cell has a 7.5 kHz sub-carrier spacing, when the FFT is idle, samples corresponding to one OFDM symbol from the NB cell (with 7.5 kHz sub-carrier spacing) are played back from the buffer 40 to the FFT 42. The signal is then frequency adjusted to fit the FFT grid. The control unit takes the different sub-carrier spacing into account and computes the required frequency adjustment (i.e., $\Omega$). The CU applies a frequency shift, $e^{j\Omega t}$, to the signal form the buffer.

Figure 6A:
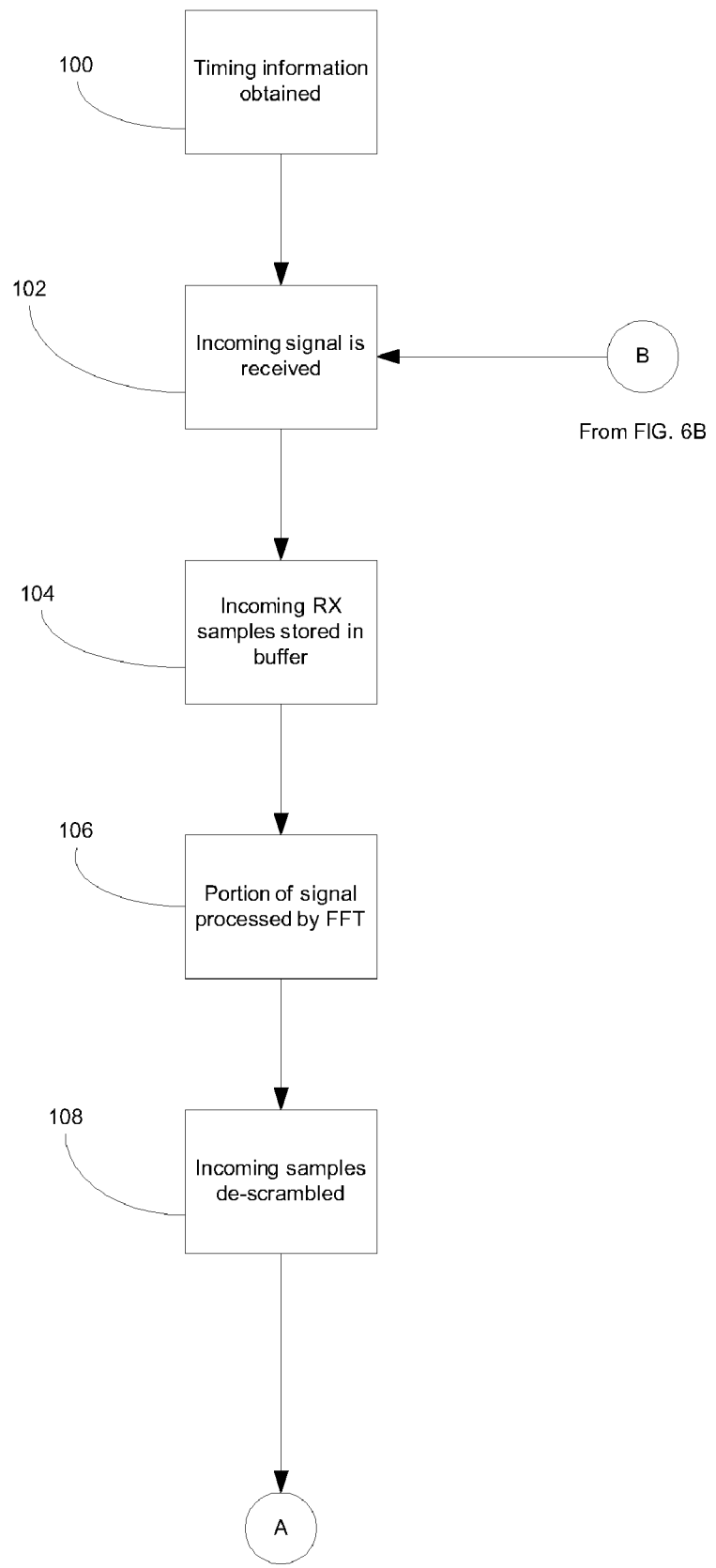
FIG. 6 is a block diagram illustrates the steps of conducting cell measurements according to the teachings of the present invention.
Figure 6B:
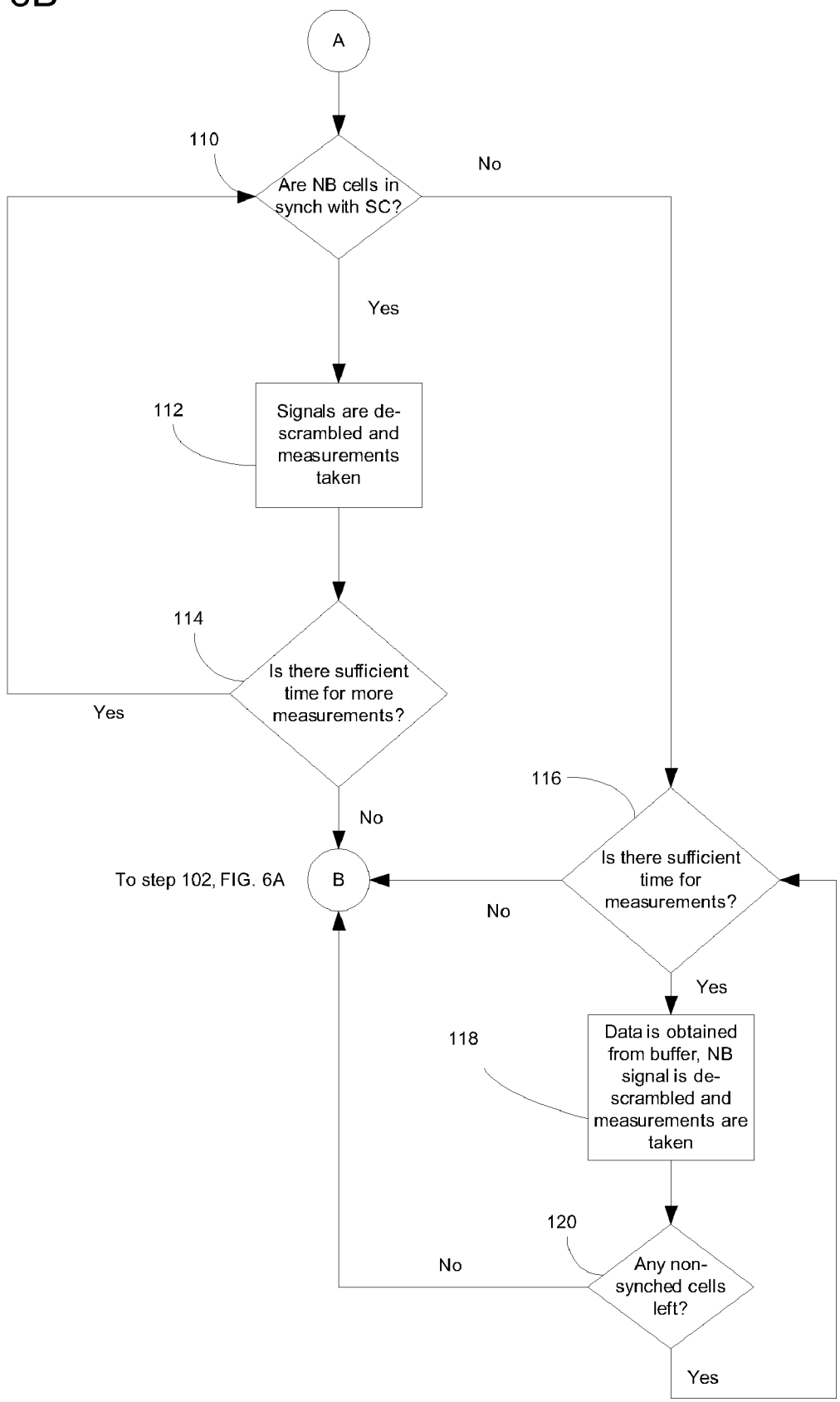

FIG. 6 is a block diagram illustrates the steps of conducting cell measurements according to the teachings of the present invention. With reference to FIGS. 1-6, the method will now be explained. The method begins with step 100 where timing information on the SC 24 and the NB cell 26 is obtained. Specifically, the timing of the SC 24, $T_{sc}$, and the neighbor cells 26, $T_{NB}$, is provided during a cell search procedure. The method then moves to step 102 where an incoming signal is received. In step 104, incoming RX samples are stored in the buffer 40. Next, in step 106, a portion of the signal corresponding to cell timing $T_{sc}$ is processed by the FFT 42. Next, in step 108, the incoming samples are de-scrambled using a specific scrambling code of the SC 24. The main task of the receiver 30 is then accomplished. Specifically, the detection of the data sent from the serving cell is completed. Furthermore, measurement on the received pilot signal strength from the SC 24 is performed. The method then moves to step 110 where it is determined if there are NB cells with a timing $T_{NB}$ having an approximate equal value as $T_{sc}$. Specifically, it is determined if any NB signals are synchronized with the SC. $T_{NB}$ does not have to match exactly with $T_{sc}$, rather the difference between the timing $T_{NB}$ and the timing $T_{sc}$ is within a length of a cyclic prefix of the OFDM symbol. In step 110, if it is determined that there are NB cells with a timing $T_{NB}$ having an approximate equal value as $T_{sc}$, the NB signal is de-scrambled and the NB signal strength is measured (i.e., estimated) by the meas unit 43 in step 112. The method then moves to step 114 where it is determined if there is sufficient time to complete additional measurements. If it is determined that there is sufficient time to conduct more measurements, the method moves from step 114 to step 110. In step 112, if there is not sufficient time to perform additional measurements, the method moves to step 102.

In step 110, if it is determined that there are no NB signals synched with the SC, the method moves to step 116 where it is determined if there is sufficient time available to complete the processing of other NB cell signals and that there are other NB cells to measure and process. If it is determined that there is sufficient time, the method moves to step 118 where the data is obtained from the buffer. In addition, the data (including the $T_{NB}$) is provided to the FFT 42. The FFT processed samples are de-scrambled to obtain the NB reference symbols and a measurement of the NB cells is accomplished by the meas unit 43. Next, the method moves to step 120 where it is determined if there are any non-synched cells remaining. In step 120, if it is determined that there is non-synched cells remaining, the method moves to step 116. However, in step 120, if it is determined that there are not any non-synched cells remaining, the method returns to step 102.

A list of the most relevant neighbor cells is preferably maintained in order to prioritize the measurements for the different cells. This list is preferably ordered such that stronger cells have higher priority since they are more likely to be selected as serving cells in the near future. Furthermore, the list preferably contains information about elapsed time since the last measurement on each cell in order to ensure measurements with reasonable regularity. Thus, steps 114 and 116 of FIG. 6 include performing the actions based on the priority list. In addition, any metric for comparing the SC with NB cells may be utilized. However, typically either signal-to-noise ratio (SNR) or received signal strength is utilized as the metric for comparing the SC with NB cells.

In the preferred embodiment of the present invention, a method and system are providing for conducting NB cell measurements and cell searching covering all the scenarios discussed in FIGS. 1, 2A and 2B where all the NB cell measurements may be conducted without interruption in the reception of the data from SC, i.e., as intra-frequency measurements. Either based on a neighbor cell list or based on detected cells, the receiver measures specified NB cells. The signal corresponding to the respective NB cell is processed by the FFT. In addition, measurements are performed on the measurement portion of the signal, at time instances when the FFT is idle, i.e. when the FFT is not processing the signal of the SC. This can be achieved by storing the received signal in the buffer and playing back the received signal to the FFT. If the NB cell carrier frequency is not he same as the SC (e.g., due to some offset commanded by the network or due to Doppler) a frequency adjustment unit adjusts the frequency to match the FFT frequency bins prior to the FFT processing. Furthermore, in the preferred embodiment of the present invention, when measurements are done on NB cells using gaps in the SC reception, as ordered by the network (i.e., FIGS. 2A and 2B), the radio front end receiver is turned off and the data from the buffer is played back, optionally frequency adjusted and processed by the FFT. Thus, mobile terminal power is conserved during the reception gap.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates all modifications that fall within the scope of the invention defined by the following claims.

What is claimed is:

1. A method of performing cell measurements in a telecommunications system, the method comprising the steps of:
   receiving a signal by a user equipment (UE) operating within the telecommunications system and served by a serving cell, and within range of at least one neighbor (NB) cell based on a NB cell list or detected NB cell;
   storing the received signal in a buffer;
   determining a first portion of the signal related to the serving cell and a second portion related to at least one of the NB cells;
   decoding the first portion of the signal by a Fast Fourier Transform (FFT);
   estimating a signal strength of the first portion of the signal by a measurement unit coupled to the FFT;
   determining if any NB cell signal by the UE in the second portion of the signal is in approximate time synchronization with the serving cell;
   upon determining that a NB cell signal of the second portion of the signal is in approximate time synchronization with a serving cell of the UE, estimating a signal strength of the NB cell signal in approximate time synchronization by the measurement unit;
   determining if sufficient time remains to process NB cell signals of the second portion of the signal that are not in approximate time synchronization; and
   upon determining that sufficient time remains, to process NB cell signals of the second portion of the signal that are not in approximate time synchronization, playing back the second portion of the signal, decoding the second portion using the FFT and estimating a signal strength of any NB cell signals of the second portion of the received signal that are not in approximate time synchronization.

2. The method of performing cell measurements in a telecommunications system of claim 1 wherein the received signal is an Orthogonal Frequency Division Multiplexing (OFDM) symbol.

3. The method of performing cell measurements in a telecommunications system of claim 2 wherein the FFT processes data of the OFDM symbol at a rate at least twice as fast as a symbol rate of the OFDM symbol.

4. The method of performing cell measurements in a telecommunications system of claim 2 wherein the step of determining if any NB cell signal by the UE in the second portion of the signal is in approximate time synchronization with the serving cell includes determining if a timing $T_{sc}$ of the serving cell is approximately equivalent with a timing $T_{NB}$ of a detected NB cell within the second portion of the signal.

5. The method of performing cell measurements in a telecommunications system of claim 4 wherein the step of determining if a timing $T_{sc}$ of the serving cell is approximately equivalent with a timing $T_{NB}$ of a detected NB cell includes determining if the difference between the timing $T_{NB}$ and the timing $T_{sc}$ is within a length of a cyclic prefix of the OFDM symbol.

6. The method of performing cell measurements in a telecommunications system of claim 2 wherein a control unit within the UE determines if a signal from any NB cell in the telecommunication system is in approximate time synchronization with the serving cell.

7. The method of performing cell measurements in a telecommunications system of claim 2 wherein the step of determining if sufficient time remains to process NB cell signals of the second portion that are not in approximate time synchronization includes determining if the UE receives a new signal requiring processing by the FFT, wherein if a new signal is received, insufficient time remains to process unsynchronized NB cell signals of the second portion of the received signal.

8. The method of performing cell measurements in a telecommunications system of claim 2 further comprising, prior to the step of determining if any NB cell signal by the UE in the second portion of the signal is in approximate time synchronization with the serving cell, the step of determining if sufficient time remains to process a NB cell signal of the second portion of the received signal that is in approximate time synchronization with the serving cell.

9. The method of performing cell measurements in a telecommunications system of claim 8 wherein the step of determining if sufficient time remains to process a signal from any detected NB cell in approximate time synchronization with the serving cell includes determining if the UE receives a new signal requiring processing by the FFT, wherein if a new signal is received, insufficient time remains to process NB cell signals of the second portion of the received signal that is in approximate time synchronization with the serving cell.

10. The method of performing cell measurements in a telecommunications system of claim 2 further comprising the step of determining which NB cell signal within the second portion is processed by the FFT based on an estimated signal strength and time for NB cell signals within the second portion.

11. The method of performing cell measurements in a telecommunications system of claim 10 wherein the step of determining which NB cell signal within the second portion is processed by the FFT includes organizing a list containing estimated signal strength in previous measurements and time instances of the previous measurements to determine which NB cells to perform measurements.

12. The method of performing cell measurements in a telecommunications system of claim 2 further comprising the step of performing a frequency correction for each OFDM symbol based upon frequency error estimate for each NB cell prior to processing by the FFT.

13. The method of performing cell measurements in a telecommunications system of claim 1 wherein the step of decoding the second portion using the FFT includes turning off a receiver of the UE when decoding the second portion of the signal.

14. An apparatus for performing cell measurements in a telecommunications system, the system comprising:
   a receiver for receiving a signal by a user equipment (UE) operating within the telecommunications system and served by a serving cell and within range of at least one neighbor (NB) cell based on a NB cell list or detected NB cell;
   a buffer for storing the received signal;
   a Fast Fourier Transform (FFT) module for processing a signal;
   a measurement unit for decoding and estimating a signal strength of a decoded signal;
   means for determining a first portion of the signal relating to the serving cell and a second portion related to at least one of the NB cells;
   wherein the first portion is processed first by the FFT module;
   means for determining if any NB cell signal within the second portion is in approximate time synchronization with the serving cell;
   wherein the measurement unit decodes and estimates a signal strength of any NB cell signal of the second portion of the received signal which is in approximate time synchronization with the serving cell; and
   means for determining if sufficient time remains to process any NB cell signal of the second portion which is not in approximate time synchronization with the serving cell;
   wherein the receiver, upon determining that sufficient time remains to process any NB cell signal of the second portion of the signal which is not in approximate time synchronization with the serving cell, plays back the second portion of the signal, decodes the second portion using the FFT module and estimates a signal strength of any NB cell signal of the second portion of the received signal which is not in approximate time synchronization with the serving cell.

15. The apparatus for performing cell measurements in a telecommunications system of claim 14 wherein the received signal is an Orthogonal Frequency Division Multiplexing (OFDM) symbol.

16. The apparatus for performing cell measurements in a telecommunications system of claim 15 wherein the FFT processes data of the OFDM symbol at a rate at least twice as fast as a symbol rate of the OFDM symbol.

17. The apparatus for performing cell measurements in a telecommunications system of claim 15 wherein the means for determining if any NB cell signal within the second portion is in approximate time synchronization with the serving cell includes means for determining if a timing $T_{sc}$ of the serving cell is approximately equivalent with a timing $T_{NB}$ of a detected NB cell within the second portion of the received signal.

18. The apparatus for performing cell measurements in a telecommunications system of claim 17 wherein means for determining if a timing $T_{sc}$ of the serving cell is approximately equivalent with a timing $T_{NB}$ of a detected NB cell includes means for determining if the difference between the timing $T_{NB}$ and the timing $T_{sc}$ is within a length of a cyclic prefix of the OFDM symbol.

19. The apparatus for performing cell measurements in a telecommunications system of claim 15 wherein the means for determining if any NB cell signal within the second portion is in approximate time synchronization with the serving cell is a control unit within the UE.

20. The apparatus for performing cell measurements in a telecommunications system of claim 15 wherein:
   the means for determining if sufficient time remains to process any NB cell signal of the second portion which is not in approximate time synchronization with the serving cell includes means for determining if the UE receives a new signal that requires processing by the FFT module; and
   the FFT module stops processing the second portion of the received signal and processes the first portion of the new signal.

21. The apparatus for performing cell measurements in a telecommunications system of claim 15 further comprising means for determining if sufficient time remains to process a NB cell signal of the second portion of the received signal which is in approximate time synchronization with the serving cell.

22. The apparatus for performing cell measurements in a telecommunications system of claim 21 wherein means for determining if sufficient time remains to process a NB cell signal of the second portion of the received signal which is in approximate time synchronization with the serving cell includes means for determining if the UE receives a new signal requiring processing by the FFT module, wherein if a new signal is received, insufficient time remains to process any NB cell signal of the second portion of the received signal which is in approximate time synchronization with the serving cell.

23. The apparatus for performing cell measurements in a telecommunications system of claim 15 further comprising means for determining which NB cell signal within the second portion is processed by the FFT module based upon an estimated signal strength and time for NB cell signals within the second portion.

24. The apparatus for performing cell measurements in a telecommunications system of claim 23 wherein means for determining which NB cell signal within the second portion is processed by the FFT module includes means for organizing a list containing estimated signal strength in previous measurements and time instances of the previous measurements to determine which NB cells to perform measurements.

25. The apparatus for performing cell measurements in a telecommunications system of claim 15 further comprising means for performing a frequency correction for each OFDM symbol based upon frequency error estimate for NB cell within the second portion prior to processing by the FFT module.

26. The apparatus for performing cell measurements in a telecommunications system of claim 14 wherein a receiver of the UE is turned off when decoding the second portion of the signal.

* * * * *

UNITED STATES PATENT AND TRADEMARK OFFICE
CERTIFICATE OF CORRECTION

PATENT NO. : 7,729,315 B2                                         Page 1 of 1
APPLICATION NO. : 11/764651
DATED           : June 1, 2010
INVENTOR(S)     : Lindoff et al.

It is certified that error appears in the above-identified patent and that said Letters Patent is hereby corrected as shown below:

In the Drawings

In Fig. 5, Sheet 5 of 7, delete "  " and insert

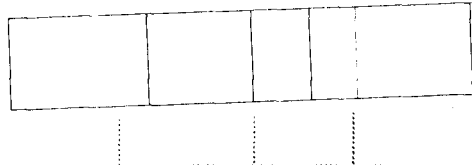        --, therefor.

In Column 4, Line 13, delete "DRAWING" and insert -- DRAWINGS --, therefor.

Signed and Sealed this

Sixteenth Day of November, 2010

David J. Kappos
*Director of the United States Patent and Trademark Office*